United States Patent
Shah (10) Patent No.: US 11,405,129 B2
(45) Date of Patent: Aug. 2, 2022

(54) UPLINK MODULATION MODE BASED ON UE CONDITIONS

(71) Applicant: T-Mobile USA, Inc., Bellevue, WA (US)

(72) Inventor: Darshan Shah, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 63 days.

(21) Appl. No.: 16/920,052

(22) Filed: Jul. 2, 2020

(65) Prior Publication Data

US 2022/0006558 A1  Jan. 6, 2022

(51) Int. Cl.
| | | |
|---|---|---|
| *H04L 12/50* | (2006.01) | |
| *H04L 1/00* | (2006.01) | |
| *H04L 27/34* | (2006.01) | |
| *H04W 52/36* | (2009.01) | |

(52) U.S. Cl.
CPC ............ *H04L 1/0003* (2013.01); *H04L 27/34* (2013.01); *H04W 52/367* (2013.01)

(58) Field of Classification Search
CPC ...................................................... H04L 12/50
USPC .......................................................... 370/329
See application file for complete search history.

(56) References Cited

U.S. PATENT DOCUMENTS

2020/0305151 A1\* 9/2020 Shimezawa ............ H04B 7/068

\* cited by examiner

*Primary Examiner* — Dang T Ton
(74) *Attorney, Agent, or Firm* — Lee & Hayes, P.C.

(57) ABSTRACT

An apparatus, method, and system disclosed herein are directed to a user equipment (UE) capable of switching an uplink modulation mode to a higher order modulation mode based on communication, or link, conditions and a condition associated with the UE. The UE, in response to receiving a request to change a current uplink modulation mode to a new modulation mode having a higher order modulation, may determine whether a current condition associated with the UE meets a predetermined condition. In response to determining that the current condition, including a current transmit power level and a current battery power level, meets the predetermined condition, the UE may generate a confirmation indicating that the current condition meets the predetermined condition, send the confirmation, and change the uplink modulation mode to the new modulation mode.

17 Claims, 3 Drawing Sheets

UPLINK MODULATION MODE BASED ON UE CONDITIONS

BACKGROUND

Modern telecommunications systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. As increased capabilities of user equipment (UE) enable greater data consumption, placing increased demands on networks, new networks with higher capabilities have been developed.

5G telecommunications technologies are the next generation mobile networks that are designed to combine both an evolution and revolution of the existing LTE/LTE-A mobile networks to provide a much higher connectivity, greater throughput, much lower latency, and ultra-high reliability to support new use cases and applications.

The 5G telecommunications technologies utilize the existing LTE frequency band (600 MHz to 6 GHz) and millimeter wave (mmWave) bands (24-86 GHz) and aim to provide higher data rates and low latency. To achieve higher data rates, modulation schemes used to encode data into signals in the cellular telecommunication networks have steadily evolved, for example, Gaussian Minimum Shift Keying (GMSK) modulation, a variant of Phase Shift Keying (PSK) for the 2G, Quadrature PSK (QPSK) for the 3G, QPSK, 16-phase quadrature amplitude modulation (16QAM), and 64QAM for the LTE, and 256QAM for the LTE Advanced and the 5G.

A higher order modulation mode, such as the 256QAM, can more efficiently communicate data, i.e., more bits per symbol, over a lower order modulation mode, such as the 16QAM and 64QAM, in the same bandwidth, however, the higher order modulation mode is more susceptible to a noise margin. In other words, as the order of modulation increases, i.e., more constellation points, the distance between the constellation points decreases, i.e., the noise margin decreases. Therefore, even if the equipment being used is capable of supporting a higher order modulation mode, simply switching over to the higher order modulation mode may not always improve the usable data rate or the bandwidth efficiency.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

An apparatus, method, and system disclosed herein are directed to a user equipment (UE) capable of switching an uplink modulation mode to a higher order modulation mode based on communication, or link, conditions and a condition associated with the UE.

The UE operating in a telecommunication network, such as a 5G cellular telecommunication network, may receive a request, from a base station or an gNodeB, to change a current uplink modulation mode, such as 64QAM, utilized by the UE to a new modulation mode, such as 256QAM. In response to receiving the request, the UE may determine whether a current condition associated with the UE meets a predetermined, or threshold, condition. For example, the UE may determine whether a current transmit power level of the UE is below a threshold transmit power level, at which there is a threshold power margin available to accommodate a peak-to-average power ratio (PAPR) of the new modulation mode without reaching a maximum transmit power of the UE. The UE may additionally, or alternatively, also determine whether a current battery power level of a battery of the UE is above a threshold battery power level, at which there is a threshold battery power remains available to maintain uplink communications using the new modulation mode for a predetermined time interval. In response to determining that the UE meets the predetermined condition or conditions, the UE may generate a confirmation indicating that the current condition meets the predetermined condition, send the confirmation to the gNodeB, and change the current uplink modulation mode to the new modulation mode.

Figure 1:
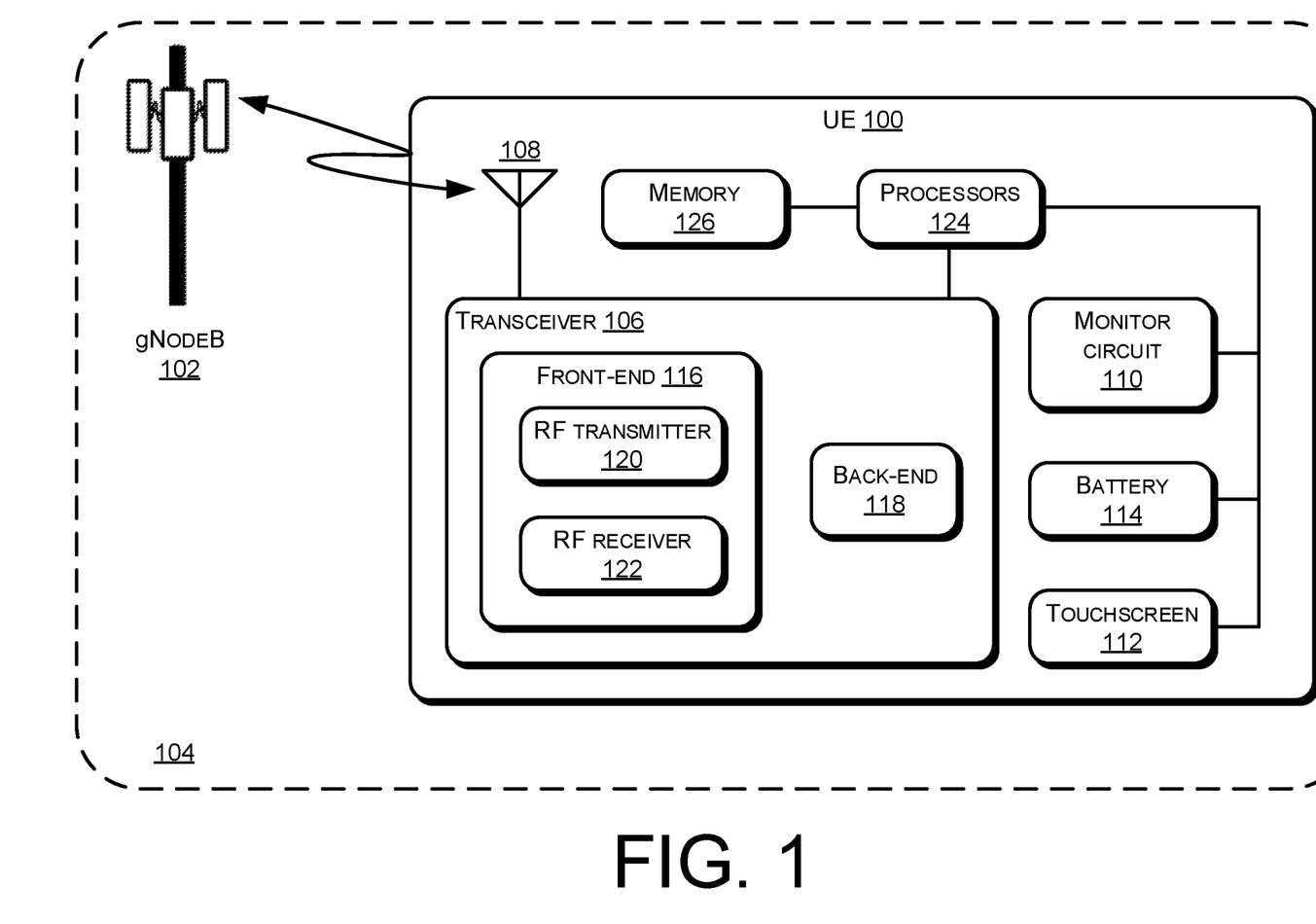
FIG. 1 illustrates an example block diagram of a user equipment (UE) capable of supporting a higher order modulation mode operating in a telecommunication network.

FIG. 1 illustrates an example block diagram of a user equipment (UE) 100 capable of supporting a higher order modulation mode in communication with a base station 102, such as an eNodeB or a gNodeB, of a telecommunication network 104.

The UE 100 may be a wireless portable communication device, such as a mobile phone, and may comprise a transceiver 106, an antenna 108 coupled to the transceiver 106, and a monitor circuit 110 coupled to the transceiver 106. The UE 100 may further comprise an input/output (I/O) interface, such as a touchscreen 112, a microphone (not shown), and a speaker (not shown), and a battery 114 to provide power to all components of the UE 100. The transceiver 106 may be categorized into two sections, a front-end 116 and a back-end 118. The front-end 116 may generally comprise radio frequency (RF) circuits, such as an RF transmitter 120, an RF receiver 122, a local oscillator (not shown), and a mixer (not shown). The front-end 116 may down-convert received RF signals such that the back-end 118 may process the down-converted received RF signals, such as extracting data. The front-end may also up-convert data from the back-end 118 to RF signals to be transmitted through the transmitter 120. The back-end 118 may also provide communication conditions, or link conditions, such as Signal-to-Interference-plus-Noise Ratio (SINR), Reference Signals Received Power (RSRP), Channel Quality Indicator, (CQI), and the like.

Additionally, the UE 100 may further comprise one or more processors (processors) 124 and memory 126 communicatively coupled to the processors 124. The processors 124 may be communicatively coupled to the transceiver 106, the monitor circuit 110, the touchscreen 112, and the battery 114. In some embodiments, the processors 124 may be a central processing unit (CPU), a graphics processing unit (GPU), or both CPU and GPU, or other processing unit or component known in the art. The memory 404 may include volatile memory (such as random access memory (RAM)) and/or non-volatile memory (such as read-only memory (ROM), flash memory, etc.). The memory 126 may also include additional removable storage and/or non-removable storage including, but not limited to, flash memory, magnetic storage, optical storage, and/or tape storage that may provide non-volatile storage of computer-readable instructions, data structures, program modules, and other data for the UE 100. The computer-readable instructions in the memory 126, when executed by the processors 124, may cause the processors 124 to perform operations described below.

The transceiver 106 may be configured to receive, via the antenna 108 and the RF receiver 122, a request from the gNodeB 102 to change a current uplink modulation mode utilized by the UE 100 to a new modulation mode. The new modulation mode may be a higher order modulation mode than the current uplink modulation mode, for example, changing from the 64QAM currently used for the uplink communication to the 256QAM. The monitor circuit 110 may be configured to determine whether the UE 100 is capable of supporting the new modulation mode, and if the monitor circuit 110 determines that the UE 100 is not capable of supporting the new modulation mode, the UE 100 may send a notification refusing the request to the gNodeB 102. If the monitor circuit 110 determines that the UE 100 is capable of supporting the new modulation mode, then the monitor circuit 110 may proceed to determine whether a current condition associated with the UE 100 meets the predetermined condition.

The monitor circuit 110 may be configured to monitor the current condition associated with the UE 100, such as a current transmit power level of the UE 100 and a current battery power level of the battery 114, and in response to the transceiver 106 receiving the request, the monitor circuit 110 may determine whether the current condition associated with the UE 100 meets a predetermined condition.

For the current transmit power level as the current condition associated with the UE 100, the monitor circuit 110 may determine whether the current transmit power level of the UE 100 is below a threshold transmit power level and determine that the current condition meets the predetermined condition if the current transmit power level is below the threshold transmit power level. Different modulation modes have different peak-to-average power ratios (PAPRs), generally higher the order, higher the PAPR. Therefore, the difference in the PAPR between the current uplink modulation mode and the new modulation mode, i.e., 64QAM and 256QAM, may be considered to avoid degrading transmission signals, for example by saturating the RF transmitter 120, once switched to the new modulation mode. The threshold transmit power level may, therefore, be set at a transmit power level at which a threshold transmit power margin is available to accommodate a PAPR of the new modulation mode without reaching a maximum transmit power of the UE 100, i.e., the RF transmitter 120.

Additionally, or alternative, to the current transmit power level of the UE 100, the current battery power level of the battery 114 may be used as the current condition associated with the UE 100. For the current battery power level of the battery 114 as the current condition associated with the UE 100, the monitor circuit 110 may determine whether the current battery power level of the battery 114 is above a predetermined, or threshold, battery power level and determine that the current condition meets the predetermined condition, or threshold, if the current battery power level is above the threshold battery power level. As described above, because different modulation modes have different PAPRs, operating using the new modulation mode, the 256QAM, may require more battery power compared to operating using the current uplink modulation mode, the 64QAM. Additionally, processing data for the 256QAM may require a higher processing power compared to the required processing power for the 64 QAM. Therefore, switching to the new modulation mode, from the 64QAM to the 256QAM, may impact a remaining operation time of the UE 100. The threshold battery power level may, therefore, be set at a battery power level of the battery 114 at which a threshold battery power remains available to maintain uplink communications using the new modulation mode for a predetermined time interval. For example, a threshold battery power level, such as a remaining battery level of 5%, may represent five minutes of a transmission time available for the UE 100 at the maximum transmit power using the new modulation mode.

In response to determining that the current condition meets the predetermined condition, the monitor circuit 110 may generate a confirmation indicating that the current condition meets the predetermined condition, and the transceiver 106 may send the confirmation to the gNodeB 102 and change the current uplink modulation mode, the 64QAM, to the new modulation mode, the 256QAM, for the uplink communication with the gNodeB 102.

In addition to evaluating the capability and the current condition of the UE 100, the monitor circuit 110 may be further configured to determine whether a current communication condition, or a link condition with the gNodeB 102, associated with the UE 100 meets a predetermined communication condition. As discussed above, the link conditions may include the SINR, RSRP, CQI, and the like, and the predetermined communication condition may be set to an acceptable value for one or more of the link conditions. The transceiver 106 may be further configured to send the confirmation in response to the monitor circuit 110 determining that the current communication condition meets the predetermined communication condition.

Figure 2:
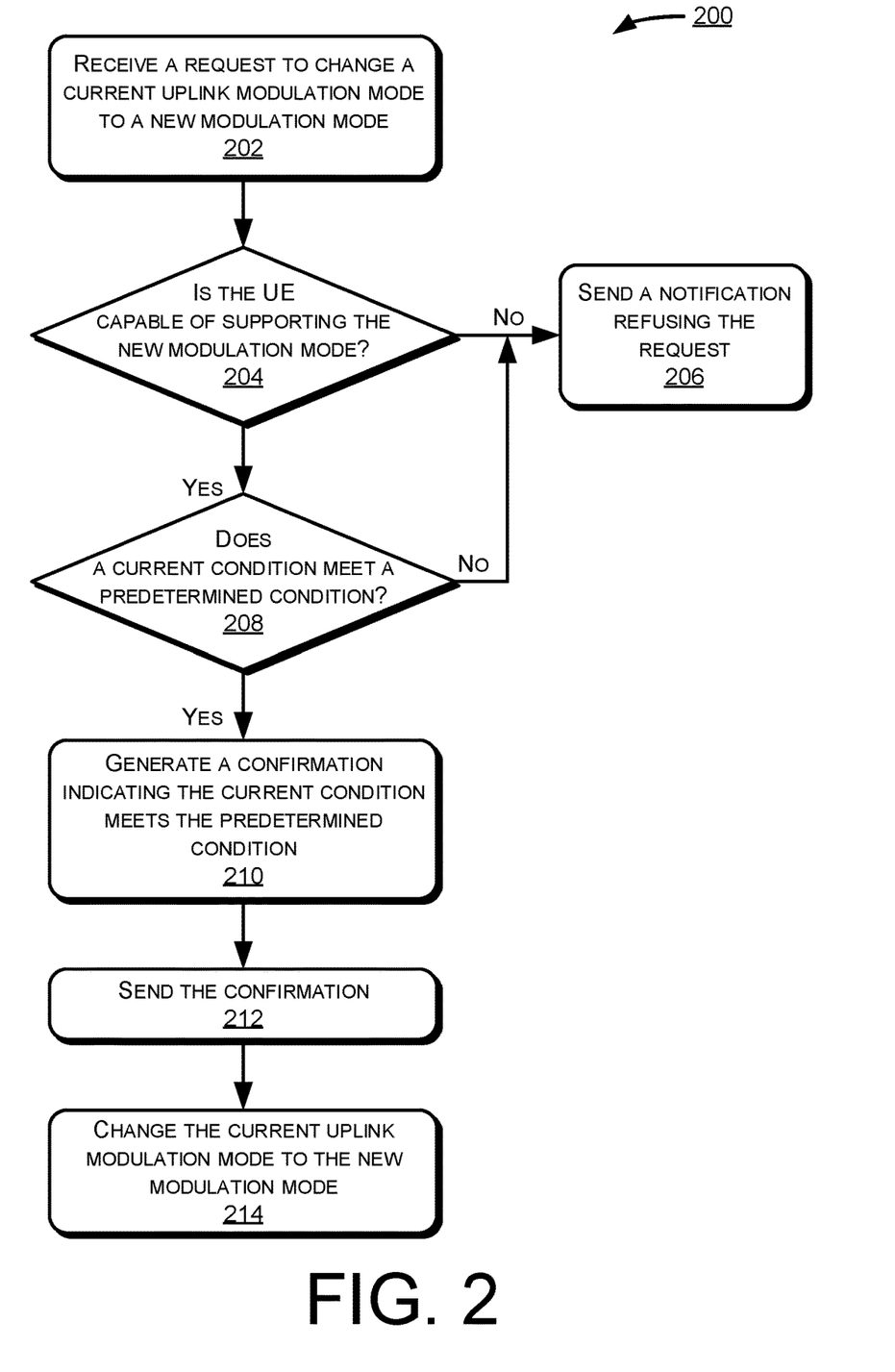
FIG. 2 illustrates an example process performed by the UE for changing the current uplink modulation mode to a new modulation mode.

FIG. 2 illustrates an example process 200 performed by UE 100 for changing the current uplink modulation mode to a new modulation mode.

As described above with reference to FIG. 1, the UE 100 may be operating in the telecommunication network 104. The UE 100 may receive a request to change a current uplink modulation mode to a new modulation mode at block 202. The new modulation mode may be a higher order modulation mode than the current uplink modulation mode, for example, changing from the 64QAM currently used for the uplink communication to the 256QAM. In response to receiving the request, the UE 100 may determine whether the UE 100 is capable of supporting the new modulation mode, i.e., the 256QAM at block 204. In response to determining that the UE 100 is not capable of supporting the new modulation mode, a notification refusing the request may be sent to the gNodeB 102 at block 206. In response to determining that UE 100 is capable of supporting the new modulation mode, the UE 100 may determine whether a current condition associated with the UE 100 meets a predetermined condition at block 208. In response to determining that the current condition does not meet the predetermined condition, a notification refusing the request may be sent to the gNodeB 102 at block 206. In response to determining that the current condition meets the predetermined condition, a confirmation indicating that the current condition meets the predetermined condition at block 210, and the confirmation may be sent to the gNodeB 102 at block 212. At block 214, the current uplink modulation mode, the 64QAM, may be changed to the new modulation mode, the 256QAM.

Figure 3:
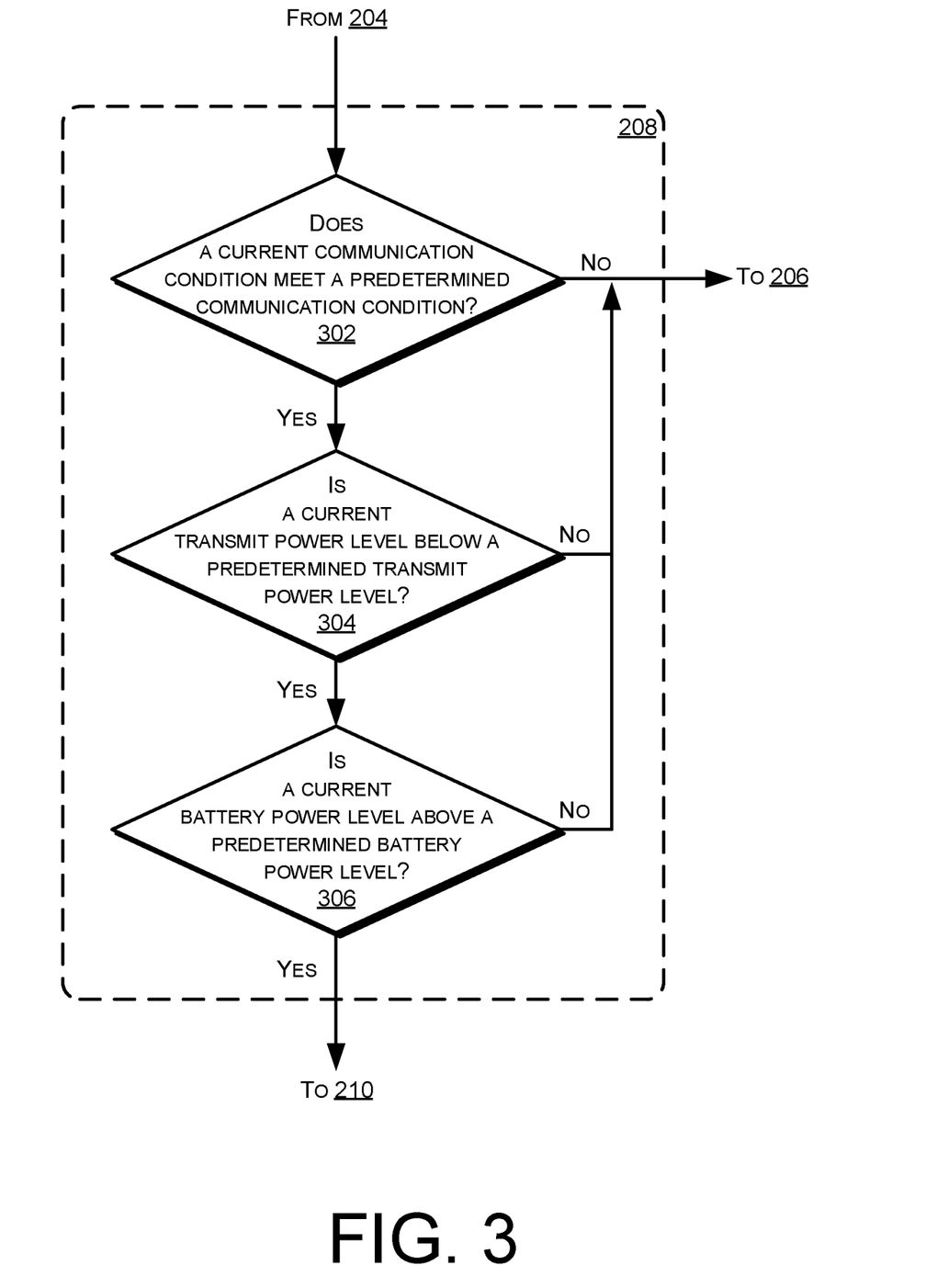
FIG. 3 illustrates an example process of one of the blocks of FIG. 2.

FIG. 3 illustrates an example process of block 208 of FIG. 2. At block 302, whether a current communication condition associated with the UE, i.e., a link condition between the UE 100 and the gNodeB 102, meets a predetermined communication condition may be determined. As described with reference to FIG. 1, the link conditions may include the SINR, RSRP, CQI, and the like, and the predetermined communication condition may be set to an acceptable value for one or more of the link conditions. In response to determining that the current communication condition does not meet the predetermined communication condition, a notification refusing the request may be sent to the gNodeB 102 as described above in reference to block 206 of FIG. 2. In response to determining that the current communication condition meets the predetermined condition, the process may proceed to determine whether a current transmit power level of the UE 100 is below a threshold transmit power level at block 304.

As described above with reference to FIG. 1, because different modulation modes have different PAPRs, the threshold transmit power level may be set at a transmit power level at which a threshold transmit power margin is available to accommodate a PAPR of the new modulation mode without reaching a maximum transmit power of the UE 100, i.e., the RF transmitter 120. Therefore, the current condition may be determined to meet the predetermined condition if the current transmit power level is below the threshold transmit power level. In response to determining that the current transmit power level is not below the threshold transmit, a notification refusing the request may be sent to the gNodeB 102 as described above in reference to block 206 of FIG. 2.

In response to determining that in response determining that the current transmit power level is below the threshold transmit power level at block 304, whether a current battery power level of the battery 114 of the UE 100 is above a threshold battery power level may be determined at block 306. As described above, because different modulation modes may have different PAPRs and require different processing power, operating using the new modulation mode, the 256QAM, may require more battery power compared to operating using the current uplink modulation mode, the 64QAM, which may impact a remaining operation time of the UE 100. The threshold battery power level may, therefore, be set at a battery power level of the battery 114 at which a threshold battery power remains available to maintain uplink communications using the new modulation mode for a predetermined time interval. For example, a threshold battery power level, such as a remaining battery level of 5%, may represent five minutes of a transmission time available for the UE 100 at the maximum transmit power using the new modulation mode.

In response to determining that the current battery power level is not above the threshold battery power level at block 306, a notification refusing the request may be sent to the gNodeB 102 as described above in reference to block 206 of FIG. 2. In response to determining that the current battery power level is above the threshold battery power level at block 306, the confirmation indicating that the current condition meets the predetermined condition may be generated at block 210 as described above with reference to FIG. 2.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media include at least two types of computer-readable media, namely computer-readable storage media and communications media. Computer-readable storage media include volatile and non-volatile, removable and non-removable media implemented in any process or technology for storage of information such as computer-readable instructions, data structures, program modules, or other data. Computer-readable storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile discs (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

EXAMPLE CLAUSES

A. A user equipment (UE) for operating in a telecommunication network, the UE comprising: a transceiver configured to receive a request to change a current uplink modulation mode utilized by the UE to a new modulation mode; and a monitor circuit coupled to the transceiver, the monitor circuit configured to: monitor a current condition associated with the UE, in response to the transceiver receiving the request, determine whether the current condition meets a predetermined condition, and in response to determining that the current condition meets the predetermined condition, generate a confirmation indicating that the current condition meets the predetermined condition; and wherein the transceiver is further configured to: send the confirmation, and change the current uplink modulation mode to the new modulation mode.

B. The UE as paragraph A recites, wherein the new modulation mode is a higher order modulation mode than the current uplink modulation mode.

C. The UE as paragraph B recites, wherein: the current condition associated with the UE includes a current transmit power level of the UE, and the monitor circuit is further configured to: determine whether the current transmit power level of the UE is below a threshold transmit power level; and in response to determining that the current transmit power level is below the threshold transmit power level, determine that the current condition meets the predetermined condition.

D. UE as paragraph C recites, wherein the threshold transmit power level is a transmit power level at which a threshold transmit power margin is available to accommodate a peak-to-average power ratio (PAPR) of the new modulation mode without reaching a maximum transmit power of the UE.

E. The UE as paragraph C recites, wherein: the UE further comprises a battery coupled to the monitor circuit and the transceiver, the current condition associated with the UE further includes a current battery power level of the battery, and the monitor circuit is further configured to: determine whether the current battery power level of the battery is above a threshold battery power level, and in response to determining that the current battery power level is above the threshold battery power level, determine that the current condition meets the predetermined condition.

F. The UE as paragraph E recites, wherein the threshold battery power level is a battery power level of the battery at which a threshold battery power remains available to maintain uplink communications using the new modulation mode for a predetermined time interval.

G. The UE as paragraph C recites, wherein the monitor circuit is further configured to: determine whether the UE is capable of supporting the new modulation mode; in response to determining that UE is capable of supporting the new modulation mode, proceed to determine whether the current condition meets the predetermined condition; and in response to determining that the UE is not capable of supporting the new modulation mode, sending a notification refusing the request.

H. The UE as paragraph C recites, wherein: the monitor circuit is further configured to determine whether a current communication condition associated with the UE meets a predetermined communication condition; and the transceiver is further configured to send the confirmation in response to the monitor circuit determining that the current communication condition meets the predetermined communication condition.

I. A method in a user equipment (UE) operating in a telecommunication network, the method comprising: receiving a request to change a current uplink modulation mode utilized by the UE to a new modulation mode; in response to receiving the request, determining whether a current condition associated with the UE meets a predetermined condition; in response to determining that the current condition meets the predetermined condition: generating a confirmation indicating that the current condition meets the predetermined condition; sending the confirmation; and changing the current uplink modulation mode to the new modulation mode.

J. The method as paragraph I recites, wherein the new modulation mode is a higher order modulation mode than the current uplink modulation mode.

K. The method as paragraph J recites, wherein determining whether the current condition associated with the UE meets the predetermined condition includes: determining whether a current transmit power level of the UE is below a threshold transmit power level; and in response to determining that the current transmit power level is below the threshold transmit power level, determining that the current condition meets the predetermined condition.

L. The method as paragraph K recites, wherein the threshold transmit power level is a transmit power level at a threshold power margin is available to accommodate a peak-to-average power ratio (PAPR) of the new modulation mode without reaching a maximum transmit power of the UE.

M. The method as paragraph K recites, wherein determining whether the current condition associated with the UE meets the predetermined includes: determining whether a current battery power level of a battery of the UE is above a threshold battery power level; and in response to determining that the current battery power level is above the threshold battery power level, determining that the current condition meets the predetermined condition.

N. The method as paragraph M recites, wherein the threshold battery power level is a battery power level of the battery at which a threshold battery power remains available to maintain uplink communications using the new modulation mode for a predetermined time interval.

O. The method as paragraph K recites, further comprising, prior to determining whether the current condition of the UE meets the predetermined condition: determining whether the UE is capable of supporting the new modulation mode; in response to determining that the UE is capable of supporting the new modulation mode, proceeding with determining whether the current condition meets the predetermined condition; and in response to determining that UE is not capable of supporting the new modulation mode, sending a notification refusing the request.

P. The method as paragraph K recites, further comprising determining whether a current communication condition associated with the UE meets a predetermined communication condition, and wherein sending the confirmation includes sending the confirmation in response to determining that the current communication condition meets the predetermined communication condition.

Q. A user equipment (UE) system used in a telecommunication network, the system comprising: a transceiver; a monitor circuit coupled to the transceiver; one or more processors coupled to the transceiver and the monitor circuit; and memory coupled to the one or more processors, the memory storing computer-readable instructions that, when executed by the one or more processors, cause the one or more processors to perform operations comprising: receiving, by the transceiver, a request to change a current uplink modulation mode utilized by the UE system to a new modulation mode, in response to the transceiver receiving the request, determining, by the monitor circuit, whether a current condition associated with the UE system meets a predetermined condition, in response to the monitor circuit determining that the current condition meets the predetermined condition, generating, by the monitor circuit, a confirmation indicating that the current condition meets the predetermined condition, sending, by the transceiver, the confirmation, and changing, by the transceiver, the current uplink modulation mode to the new modulation mode.

R. The UE system as paragraph Q recites, wherein the new modulation mode is a higher order modulation mode than the current uplink modulation mode.

S. The UE system as paragraph Q recites, wherein: the current condition associated with the UE system includes a current transmit power level of the UE system, and the operations further comprise: determining, by the monitor circuit, whether the current transmit power level of the UE system is below a threshold transmit power level, the threshold transmit power level being a transmit power level at which a threshold transmit power margin is available to accommodate a peak-to-average power ratio (PAPR) of the new modulation mode without reaching a maximum transmit power of the UE system; and in response to determining that the current transmit power level is below the threshold transmit power level, determining, by the monitor circuit, that the current condition meets the predetermined condition.

T. The UE system as paragraph Q recites, wherein: the UE system further comprises a battery coupled to the monitor circuit and the transceiver, the current condition associated with the UE system further includes a current battery power level of the battery, and the operations further comprise: determining, by the monitor circuit, whether the current battery power level of the battery is above a threshold battery power level, the threshold battery power level being a battery power level of the battery at which a threshold battery power remains available to maintain uplink communications using the new modulation mode for a predetermined time interval, and in response to determining that the current battery power level is above the threshold battery power level, determining, by the monitor circuit, that the current condition meets the predetermined condition.

U. The UE system as paragraph Q recites, wherein the operations further comprise: determining, by the monitor circuit, whether the UE system is capable of supporting the new modulation mode; in response to determining that the UE system is capable of supporting the new modulation mode, proceed to determine whether the current condition meets the predetermined condition; and in response to determining that UE system is not capable of supporting the new modulation mode, sending a notification refusing the request.

V. The UE system as paragraph R recites, wherein the operations further comprise: determining, by the monitor circuit, whether a current communication condition associated with the UE system meets a predetermined communication condition; and sending, by the transceiver, the confirmation in response to the monitor circuit determining that the current communication condition meets the predetermined communication condition.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A user equipment (UE) for operating in a telecommunication network, the UE comprising:
    a transceiver configured to receive a request to change a current uplink modulation mode utilized by the UE to a new modulation mode; and
    a monitor circuit coupled to the transceiver, the monitor circuit configured to:
        monitor a current condition associated with the UE, wherein the current condition associated with the UE includes a current transmit power level of the UE,
        determine whether the current transmit power level of the UE is below a threshold transmit power level,
        in response to the transceiver receiving the request, determine whether the current condition meets a predetermined condition, wherein the determining includes, in response to determining that the current transmit power level is below the threshold transmit power level, determining, by the monitor circuit, that the current condition meets the predetermined condition, and
        in response to determining that the current condition meets the predetermined condition, generate a confirmation indicating that the current condition meets the predetermined condition; and
    wherein the transceiver is further configured to:
        send the confirmation, and
        change the current uplink modulation mode to the new modulation mode.

2. The UE of claim 1, wherein the new modulation mode is a higher order modulation mode than the current uplink modulation mode.

3. The UE of claim 1, wherein the threshold transmit power level is a transmit power level at which a threshold transmit power margin is available to accommodate a peak-to-average power ratio (PAPR) of the new modulation mode without reaching a maximum transmit power of the UE.

4. The UE of claim 1, wherein:
    the UE further comprises a battery coupled to the monitor circuit and the transceiver,
    the current condition associated with the UE further includes a current battery power level of the battery, and
    the monitor circuit is further configured to:
        determine whether the current battery power level of the battery is above a threshold battery power level, and
        in response to determining that the current battery power level is above the threshold battery power level, determine that the current condition meets the predetermined condition.

5. The UE of claim 4, wherein the threshold battery power level is a battery power level of the battery at which a threshold battery power remains available to maintain uplink communications using the new modulation mode for a predetermined time interval.

6. The UE of claim 1, wherein the monitor circuit is further configured to:
    determine whether the UE is capable of supporting the new modulation mode;
    in response to determining that UE is capable of supporting the new modulation mode, proceed to determine whether the current condition meets the predetermined condition; and in response to determining that the UE is not capable of supporting the new modulation mode, sending a notification refusing the request.

7. The UE of claim 1, wherein:
the monitor circuit is further configured to determine whether a current communication condition associated with the UE meets a predetermined communication condition; and
the transceiver is further configured to send the confirmation in response to the monitor circuit determining that the current communication condition meets the predetermined communication condition.

8. A method in a user equipment (UE) operating in a telecommunication network, the method comprising:
receiving a request to change a current uplink modulation mode utilized by the UE to a new modulation mode;
in response to receiving the request, determining whether a current condition associated with the UE meets a predetermined condition, wherein determining whether the current condition associated with the UE meets the predetermined condition includes:
determining whether a current transmit power level of the UE is below a threshold transmit power level; and
in response to determining that the current transmit power level is below the threshold transmit power level, determining that the current condition meets the predetermined condition;
in response to determining that the current condition meets the predetermined condition:
generating a confirmation indicating that the current condition meets the predetermined condition;
sending the confirmation; and
changing the current uplink modulation mode to the new modulation mode.

9. The method of claim 8, wherein the new modulation mode is a higher order modulation mode than the current uplink modulation mode.

10. The method of claim 8, wherein the threshold transmit power level is a transmit power level at a threshold power margin is available to accommodate a peak-to-average power ratio (PAPR) of the new modulation mode without reaching a maximum transmit power of the UE.

11. The method of claim 8, wherein determining whether the current condition associated with the UE meets the predetermined condition includes:
determining whether a current battery power level of a battery of the UE is above a threshold battery power level; and
in response to determining that the current battery power level is above the threshold battery power level, determining that the current condition meets the predetermined condition.

12. The method of claim 11, wherein the threshold battery power level is a battery power level of the battery at which a threshold battery power remains available to maintain uplink communications using the new modulation mode for a predetermined time interval.

13. The method of claim 8, further comprising, prior to determining whether the current condition of the UE meets the predetermined condition:
determining whether the UE is capable of supporting the new modulation mode;
in response to determining that the UE is capable of supporting the new modulation mode, proceeding with determining whether the current condition meets the predetermined condition; and in response to determining that UE is not capable of supporting the new modulation mode, sending a notification refusing the request.

14. The method of claim 8, further comprising:
determining whether a current communication condition associated with the UE meets a predetermined communication condition, and
wherein sending the confirmation includes sending the confirmation in response to determining that the current communication condition meets the predetermined communication condition.

15. A user equipment (UE) system used in a telecommunication network, the system comprising:
a transceiver;
a monitor circuit coupled to the transceiver;
one or more processors coupled to the transceiver and the monitor circuit; and
memory coupled to the one or more processors, the memory storing computer-readable instructions that, when executed by the one or more processors, cause the one or more processors to perform operations comprising:
receiving, by the transceiver, a request to change a current uplink modulation mode utilized by the UE system to a new modulation mode,
in response to the transceiver receiving the request, determining, by the monitor circuit, whether a current condition associated with the UE system meets a predetermined condition, wherein the current condition associated with the UE system includes a current transmit power level of the UE system, wherein the determining includes:
determining, by the monitor circuit, whether the current transmit power level of the UE system is below a threshold transmit power level, the threshold transmit power level being a transmit power level at which a threshold transmit power margin is available to accommodate a peak-to-average power ratio (PAPR) of the new modulation mode without reaching a maximum transmit power of the UE system, and
in response to determining that the current transmit power level is below the threshold transmit power level, determining, by the monitor circuit, that the current condition meets the predetermined condition,
in response to the monitor circuit determining that the current condition meets the predetermined condition, generating, by the monitor circuit, a confirmation indicating that the current condition meets the predetermined condition,
sending, by the transceiver, the confirmation, and
changing, by the transceiver, the current uplink modulation mode to the new modulation mode.

16. The UE system of claim 15, wherein the new modulation mode is a higher order modulation mode than the current uplink modulation mode.

17. The UE system of claim 15, wherein:
the UE system further comprises a battery coupled to the monitor circuit and the transceiver,
the current condition associated with the UE system further includes a current battery power level of the battery, and
the operations further comprise:
determining, by the monitor circuit, whether the current battery power level of the battery is above a threshold battery power level, the threshold battery power level being a battery power level of the battery at which a threshold battery power remains available to maintain uplink communications using the new modulation mode for a predetermined time interval, and in response to determining that the current battery power level is above the threshold battery power level, determining, by the monitor circuit, that the current condition meets the predetermined condition.

\* \* \* \* \*